Patented May 2, 1933

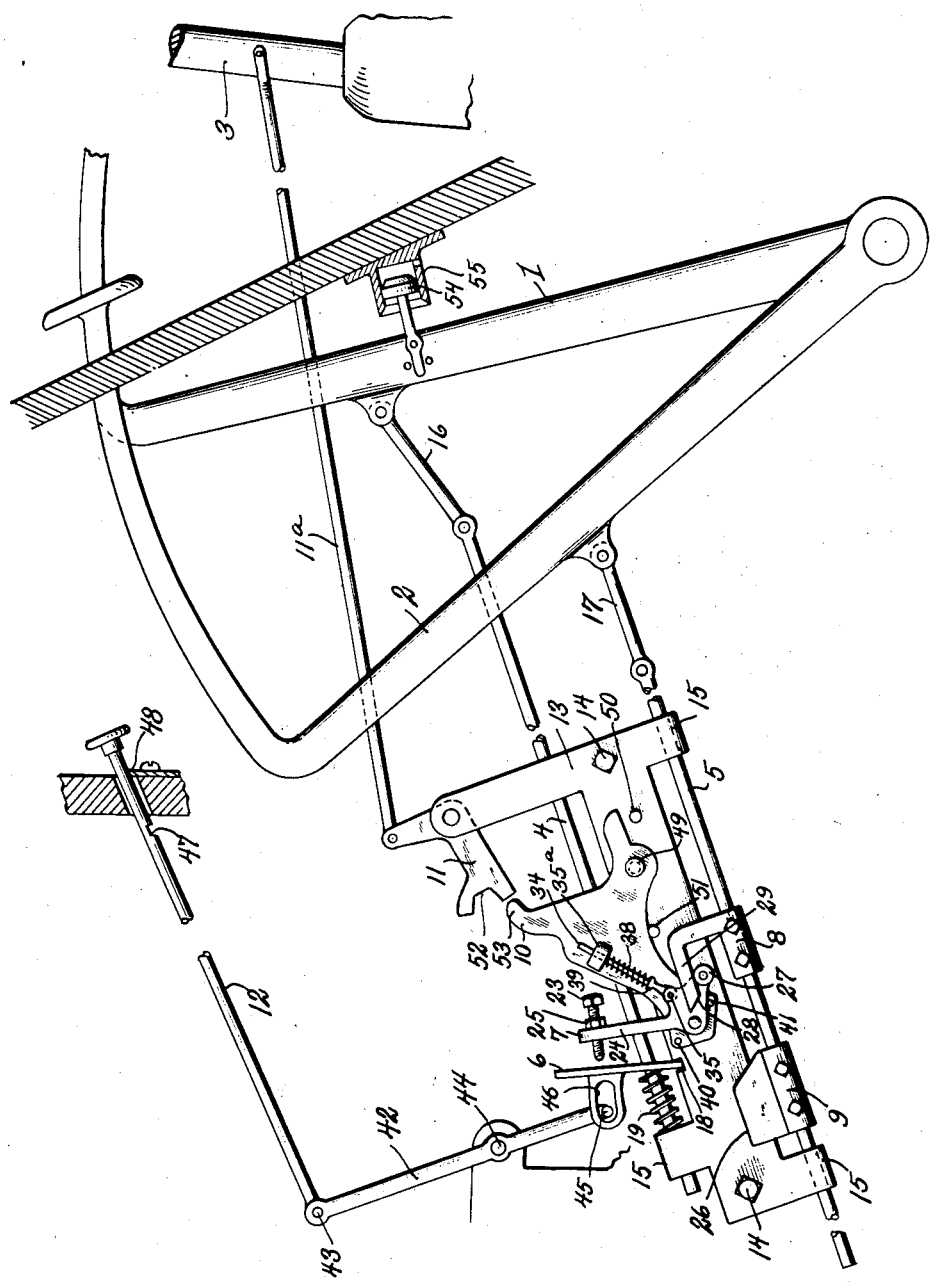

1,906,571

UNITED STATES PATENT OFFICE

CHARLES B. GILMORE, OF CHICAGO, ILLINOIS

CONTROL MECHANISM

Application filed April 17, 1929, Serial No. 355,713. Renewed September 12, 1932.

My invention relates to control mechanism for automobiles and more particularly to a control mechanism for restraining the vehicle against any undesired movement.

Some of the construction shown in this application is also disclosed in my copending application Serial No. 237,428, filed December 3, 1927.

One of the objects of my invention is to provide means whereby, when desired, the driver of the car may hold the car on an incline either upgrade or downgrade and be able to start the car from this position easily.

A further object is to provide a construction, as indicated above, in which the desired result is accomplished by providing means for holding the foot brake applied, released by the connecting movement of the clutch, but held from release if the gear shift is in neutral.

A further object of my invention is to provide means whereby the driver may at will cause the retard mechanism to be automatically held in retard position, thereby relieving the driver of the effort of holding the vehicle from movement in any undesired direction and without the use of the emergency or hand-operated brake.

A further object is to provide means to permit the vehicle-propelling elements to remain in operation such as the engagement of the at present used clutch while said retard element is effective.

A further object is to provide means whereby the retard of the vehicle will be held effective automatically and while the speed-changing mechanism, such as the shiftable gears, may be set in neutral or any functional position until released automatically upon the initiation of propulsion of the vehicle.

Further objects will appear from the description and claims.

In the drawing in which an embodiment of my invention is shown, the figure is a side elevation showing the brake pedal, clutch pedal, gear shift lever and control mechanism associated with these parts.

Referring to the drawing in detail, the construction shown therein comprises a brake pedal 1 normally held by a spring (not shown) in a non-braking position, a clutch pedal 2 normally held by a spring (not shown) in clutch-engaging position, a gear shift lever 3 for controlling the variable speed transmission shiftable to neutral position in which the power is disconnected from the propulsion, a brake-holding slide 4 connected with the brake pedal 1, a cam-carrying and clutch-holding slide 5 connected with the clutch pedal 2, a latch or gripping member 6 cooperating with the brake-holding slide 4, a bell-crank restraining lever 7 which normally holds the gripping member 6 in inoperative position, a pair of cams 8 and 9 on the cam-carrying slide 5 for controlling the bell-crank lever 7, a rock frame 10 on which the bell-crank lever 7 is mounted, a pivotally mounted blocking lever 11 for controlling the rock frame 10 and a link 11a pivotally connecting the blocking lever and gear shift lever. The construction also comprises a pull rod 12 operable by the driver which is in operative relation with the latch 6 for the brake-holding slide so that when desired the driver can prevent this latch from engaging the brake-holding slide 4 regardless of the position of the latch-controlling lever 7.

The brake-holding slide 4, the cam-carrying and clutch-holding slide 5, the gripping member 6, the restraining lever 7 and the blocking lever 11 may all be mounted on a supporting bracket 13 secured by means of screws or bolts 14 to the engine block or some part of the chassis. The slides 4 and 5 are slidable in spaced bearings 15 formed on this bracket. These slides 4 and 5 are connected with the pedals 1 and 2 respectively by means of links 16 and 17. The gripping member 6 is pivotally mounted in a notch 18 formed in the bracket 13 and is pressed into gripping engagement with the rod 4 by means of a coil-compression spring 19 which surrounds the rod 4, one end bearing against the guide 15 for the slide 4 and the other bearing against the gripping member 6. The gripping engagement with the slide 4 is effected by making this slide pass through a hole in the gripping member 6, the hole being somewhat larger in diameter than the slide 4 so that when the gripping member 6 is at right angles to the slide 4 it will exert no gripping effect but will permit the slide to move freely in the hole. However, when the restraining lever 7 is moved away from the gripping member 6 the edges of the hole in the gripping member will bind against the slide and will hold it in any position to which it may be depressed by the pedal 1. The gripping member will, of course, permit the slide to move freely to the left but will resist any movement of the slide 4 to the right.

In order to secure just the right relation between the gripping member 6 and the restraining lever 7 the latter has mounted thereon an adjustable stop screw 23 threaded through the long arm 24 of the lever and held in adjusted position by means of a lock nut 25. The point of this screw engages the gripping member 6 when the clutch pedal 2 is in its normal raised position to hold the gripping member in inoperative condition with respect to the slide 4.

When the clutch pedal 2 is in clutch-connecting position, the cam 9 mounted on the slide 5 is in such a position as to hold the restraining lever 7 in a position to render the gripping member 6 inoperative to hold the slide 4. Furthermore, the upper surface 26 of this cam member 9 is of sufficient extent to permit the normal operation of the clutch without causing this upper surface to disengage the roller 27 on the short arm 28 of the bell-crank restraining lever 7, so that the clutch can be connected and disconnected while still maintaining the gripping member 6 inoperative with respect to the slide 4. However, if the driver should desire to render the gripping member 6 operative to cooperate with the slide 4 to hold the brake in applied position, he can accomplish this by giving an abnormal movement to the clutch pedal 2 of sufficient extent to bring the upper arm 29 of the cam member 8 into engagement with the roller 27 on the short arm of the restraining lever 7 to cause the restraining lever 7 to be moved to the position shown in the drawing, in which position the screw 23 will be moved away from operative relation with respect to the gripping member 6 and will permit this gripping member 6 to hold the slide 4 in any position to which it may be depressed by the brake pedal 1.

In order to hold the roller on the restraining lever 7 out of contact with the cams 8 and 9 and thus prevent wear on these cams and the cooperating roller 27, I provide a spring construction which will hold the restraining lever in either of the extreme positions to which it may be moved. This spring construction comprises a link 34 pivotally connected at 35 to the restraining lever 7 and having its upper end slidable in an opening in a lug 35A on the rockframe 10, and a coil compression spring 38 surrounding this link 34 and bearing at one end against a collar 39 on the link and at its upper end against the lug 35A. The construction is such that the pivotal connection 35 between the link and the lever moves past the dead-center in moving from one extreme position to the other so that this spring will hold the restraining lever in either of its extreme positions, which extreme positions are determined by means of a pair of stop pins 40 and 41 secured to the bracket 13.

The construction by means of which the driver may when he desires render the gripping member 6 inoperative to hold the slide 4, comprises a lever 42 pivotally connected at 43 with the pull rod 12 and pivotally mounted at 44 on a suitable support, and having its lower end provided with a pin 45 which operates in a slot or opening 46 in the gripping member 6 thus having a lost-motion connection therewith which permits the gripping member to act when the lever is in the position shown. However, when the lever 42 is moved to the other extreme position the pin 45 on this lever is at the left-hand end of the opening 46 in the gripping member and the gripping member is thus held at right angles with respect to the slide 4 so that it cannot grip this slide.

In order to hold the pull rod in position to make the latch ineffective this rod is provided with a notch 47 which receives the edge of a retaining plate 48.

The rock frame 10 is pivotally mounted on the supporting bracket 13 by means of a suitable pivot member 49, a pair of stops 50, 51 being provided to limit the rocking movement. The movement is sufficient to permit the frame 10 to rock from a position in which the roller 27 on the restraining lever is in operative relation with respect to the cam 9, to a position above the path of this cam member so that when the rock frame is in its raised position the cam 9 can pass under the roller without causing the restraining lever to release the latch. The only time when this rock frame 10 can be in raised position is when the gear shift lever 3 is in neutral. When the gear shift lever is in neutral the notch 52 on the blocking lever 11 comes opposite the projection 53 on the rock frame 10 thus permitting the rock frame to raise when the cam 9 strikes the roller 27 on the connecting movement of the clutch. The spring 38 is sufficiently strong to cause the rock frame 10 to be raised rather than to cause releasing action of the restraining lever 24.

With this construction, it will be seen that if the driver of the car desires to hold the car on a grade for a considerable period and does not desire to hold his clutch pedal depressed such a long time he can move his gear shift lever 3 to neutral and take his foot off the clutch pedal without releasing the brake.

In order to cushion the return movement of the brake pedal when it is released by the action of the restraining lever 7, I provide a dash-pot construction comprising a piston 54 pivotally mounted on the brake pedal and engageable with a dash-pot cylinder mounted on the floor board.

In operation, if it is desired to stop and hold the car on an incline, the clutch pedal 2 is depressed to move the latch-controlling lever 7 out of operative relation with respect to the latch 6, and the brake pedal 1 is depressed sufficiently to hold the car on the incline. The latch 6 will automatically hold the brake pedal depressed. If the driver expects to wait only a short time he will hold the clutch pedal depressed until he is ready to start again, when he will let the clutch pedal up, whereupon the cam 26 will act on the lever 7 to release the latch 6 and release the brake pedal which thereupon returns to raised position, being cushioned in its final movement by the dash-pot construction 54.

If, however, the driver expects to have to stand on the incline for a considerable period, he can move the gear shift lever 3 to neutral position, thus freeing the rock frame 10 for rocking movement, so that when the cam 26 strikes the roller 27 the rock frame 10 will simply rock about its pivot 49 without moving the lever 7 to release the latch 6. The brake pedal 1 will thus be held depressed when the gear shift lever 3 is in neutral, even if the clutch pedal 2 is released.

While I have shown one embodiment of my invention, it is obvious that many modifications therein may occur to those skilled in the art and I desire, therefore, that my invention be limited only by the scope of the appended claims and by the prior art.

I claim:

1. An automobile control construction comprising brake-applying means, means for holding the brake applied, clutch-controlling means for connecting and disconnecting the power with respect to the propulsion, means whereby the connecting operation of said clutch-controlling means causes the said brake holding means to cease to hold the brake applied, variable speed transmission controlling means comprising means whereby the power may be variably connected with the propulsion to give different speed ratios, and whereby the power may be disconnected from the propulsion when desired, and means whereby when said variable speed means are in disconnecting position the connecting operation of the clutch means will not cause said brake-holding means to cease to hold the brake applied.

2. The combination with a gear shift, brake pedal and clutch pedal of an automobile, of means for holding the brake applied, means whereby the connecting movement of the clutch pedal causes the brake-holding means to release, and means whereby when the gear shift is in neutral position said brake-holding means will not be released.

In witness whereof, I have hereunto subscribed my name.

C. B. GILMORE.